United States Patent
Sloan et al.

(10) Patent No.: US 7,167,176 B2
(45) Date of Patent: Jan. 23, 2007

(54) CLUSTERED PRINCIPAL COMPONENTS FOR PRECOMPUTED RADIANCE TRANSFER

(75) Inventors: Peter-Pike Sloan, Bellevue, WA (US); John Michael Snyder, Redmond, WA (US); Jesse D. Hall, Champaign, IL (US)

(73) Assignee: Microsoft Corporation, Redmond, WA (US)

( * ) Notice: Subject to any disclaimer, the term of this patent is extended or adjusted under 35 U.S.C. 154(b) by 293 days.

(21) Appl. No.: 10/641,472

(22) Filed: Aug. 15, 2003

(65) Prior Publication Data

US 2005/0035965 A1  Feb. 17, 2005

(51) Int. Cl.
*G06T 15/50* (2006.01)

(52) U.S. Cl. ..................................... 345/426
(58) Field of Classification Search ............... 382/252, 382/253; 345/426
See application file for complete search history.

(56) References Cited

U.S. PATENT DOCUMENTS

| | | | |
|---|---|---|---|
| 6,697,062 B1 * | 2/2004 | Cabral et al. | 345/419 |
| 6,803,910 B2 * | 10/2004 | Pfister et al. | 345/420 |
| 2003/0234784 A1 * | 12/2003 | Grzeszczuk et al. | 345/426 |

OTHER PUBLICATIONS

Peter-Pike Sloan, Jan Kautz, John Snyder, "Precomputed Radiance Transfer for Real-Time Rendering in Dynamic, Low-Frequency Lighting Environment," Jul. 21, 2002, in Proceedings ACM SIGGRAPH 2002, p. 527-536.*

Hendrik P.A. Lensch, Jan Kautz, Michael Goesele, Wolfgang Heirdrich, Hans-Peter Seidel, "Image-Based Reconstruction of Spatially Varying Materials," 2001, Rendering Techniques, p. 104-115.*

Nandakishore Kambhatla, Todd K. Leen, "Dimension Reduction by Local Principal Component Analysis," 1997, Neural Computation, v. 9, p. 1493-1516.*

Jan Kautz, Peter-Pike Sloan, John Snyder, "Fast, arbitrary BRDF shading for low-frequency lighting using spherical harmonics," Jun. 26, 2002, Proceedings of the 13th Eurographics workshop on Rendering, Pisa, Italy.*

N. Kambhatla and T. K. Leen, "Fast Non-Linear Dimension Reduction", Department of Computer Science and Engineering, Oregon Graduate Institute of Science & Technology, pp. 152-159, 1994.

H. W. Jensen, et al., "A Rapid Hierarchial Rendering Technique for Translucent Materials", SIGGRAPH 2002, pp. 576-581, 2002.

(Continued)

*Primary Examiner*—Ulka Chauhan
*Assistant Examiner*—Jason M. Repko
(74) *Attorney, Agent, or Firm*—Lee & Hayes, PLLC (57) ABSTRACT

Real-time processing includes per-point transfer matrices forming a high-dimensional surface signal that is compressed using clustered principal component analysis (CPCA). CPCA partitions multiple samples into fewer clusters, each cluster approximating the signal as an affine subspace. Further, source radiance is input to a processor, which approximates source radiance using spherical harmonic basis to produce a set of source radiance coefficients. A graphics processing unit (GPU) processes the source radiance coefficients through the transfer matrix model for each cluster. The result of such processing is the exit radiance, which parameterizes the radiance leaving the surface of the object at each point, thus producing the shading for each point of the virtual object in real time.

46 Claims, 3 Drawing Sheets

OTHER PUBLICATIONS

W. Matusik et al., "Image-Based 3D Photography Using Opacity Hulls", SIGGRAPH 02, pp. 427-437, 2002.

Y. Linde, et al., "An Algorithm for Vector Quantizer Design", IEEE Transactions on Communication, vol. Com-28, No. 1, pp. 84-95, Jan. 1980.

J. J. Koenderink, et al., "Bidirectional Reflection Distribution Function Expressed in Terms of Surface Scattering Modes", Lecture Notes in Computer Science, Helmholtz Instituit, Universiteit Utrecht, pp. 28-39, 1996.

Gersho et al., "Adaptive Vector Quantization", Kluwer International Series in Engineering and Computer Sciences, SECS 159, Ch. 16, pp. 606-611, 1992.

F. X. Sillion, "A Global Illumination Solution for General Reflectance Distributions", Computer Graphics, vol. 25, No. 4, pp. 187-196, Jul. 1991.

Hendrik P.A. Lensch, et al., "Image-Based Reconstruction of Spatially Varying Materials", Rendering Techniques, pp. 104-115, 2001.

Jaakko Lehtinen and Jan Kautz, "Matrix Radiance Transfer", Symposium on Interactive 3D Graphics, pp. 59-64 and 237.

Mark Levoy and Pat Hanrahan, "Light Field Rendering", Computer Science Department, Stanford University, SIGGRAPH 96, pp. 31-42, 1996.

Steven J. Gortler, et al., "The Lumigraph", SIGGRAPH 98, pp. 43-54, 1996.

Peter-Pike Sloan, et al., "Precomputed Radiance Transfer for Real-Time Rendering in Dynamic, Low-Frequency Lighting Environment", SIGGRAPH 02, pp. 527-536, 2002.

Wei-Chao Chen, et al., "Light Field Mapping: Efficient Representation and Hardware Rendering of Surface Light Fields", SIGGRAPH 02, pp. 447-456, 2002.

Brian Cabral, et al., "Bidirectional Reflection Functions from Surface Bump Maps", SIGGRAPH 87, pp. 273-281, 1987.

Ravi Ramamoorthi and Pat Hanrahan, "An Efficient Representation for Irradiance Environment Maps", SIGGRAPH 2001, pp. 497-500, 2001.

Hendrik P.A. Lensch, et al., "Interactive Rendering of Translucent Objects", Computer Graphics Forum, vol. 22, No. 2, pp. 195-205, Jun. 2003.

Xuejun Hao et al., "Interactive Subsurface Scattering of Translucent Meshes", Symposium on Interactive 3D Graphics, pp. 75-82 and 238, 2003.

Stephen H. Westin, et al., "Predicting Reflectance Functions from Complex Surfaces", Program of Computer Graphics, Cornell University, SIGGRAPH 92, pp. 255-264, 1992.

Daniel N. Wood, et al., "Surface Light Fields for 3D Photography", SIGGRAPH 2000, pp. 287-296, 2000.

Wolfgang Heidrich and Hans-Peter Seidel, "Realistic, Hardware-accelerated Shading and Lighting", Max-Planck-Institute for Computer Science, SIGGRAPH 99, pp. 171-178, 1999.

Ziyard S. Hakura, et al., "Parameterized Animation Compression", Rendering Techniques, vol. 11, pp. 101-112, 2002.

Dr. Gavin Miller et al., "Lazy Decompression of Surface Light Fields for precomputed Global Illumination", Rendering Techniques, vol. 9, pp. 281-292, Jun. 1998.

Jan Kautz, et al., "Fast, Arbitrary BRDF Shading for Low-Frequency Lighting Using Spherical Harmonics", Eurographics Workshop on Rendering, vol. 13, pp. 291-296, 2002.

Michael E. Tipping and Christopher M. Bishop, "Mixtures of Probabilitistic Principal Component Analyzers", Neural Computation, vol. 11, No. 2, pp. 443-482, 1999.

Ko Nishino et al., "Eigen-Texture Method: Appearance Compression Based on 3D Model", Proceedings of 1999 IEEE Computer Society Conference on Computer Vision and Pattern Recognition, vol. 1, pp. 618-624, Jun. 1999.

Peter Meinicke and Helge Ritter, "Resolution-Based Complexity Control for Gaussian Mixture Models", Neural Computation, vol. 13, No. 2, pp. 453-475, 2001.

Nandakishore Kambhatla and Todd K. Leen, "Dimension Reduction by Local Principal Component Analysis", Neural Computation, vol. 9, pp. 1493-1516, 1997.

* cited by examiner

CLUSTERED PRINCIPAL COMPONENTS FOR PRECOMPUTED RADIANCE TRANSFER

RELATED APPLICATIONS

This application is related to, and incorporates by reference, U.S. patent application Ser. No. 10/389,553, filed Mar. 14, 2003, and entitled, "Graphics Image Rendering With Radiance Self-Transfer For Low-Frequency Lighting Environments," which claimed priority from U.S. Provisional Application No. 60/366,920, filed Mar. 21, 2002.

FIELD

The present application relates to computer graphics image rendering techniques, in particular the lighting and shadowing of a modeled object in a rendered image.

BACKGROUND

The rendering of real-time graphics is challenged, in part, by global illumination effects, particularly in area lighting environments requiring integration over multiple light source samples. Such illumination effects are measured as radiance passing through spherical shells about a surface point p, and include: source radiance, which originates from an infinite sphere; transferred incident radiance, which passes through an infinitesimal hemisphere and equals the source radiance decreased by self-shadowing and increased by inter-reflection; and exit radiance, which passes outward through an infinitesimal hemisphere, and results as a multiplication product of the BRDF (bi-directional reflectance distribution function) and the transferred incident radiance, plus subsurface scattering.

Spherical harmonic (SH) provides a compact, alias-avoiding representation for functions of radiance over a sphere or hemisphere (Cabral et al., 1987, *Bidirectional Reflection Functions from Surface Bump Maps*, SIGGRAPH 87, 273–281; Sillon et al., 1991, *A Global Illumination Solution for General Reflectance Distributions*, SIGGRAPH 91, 187–196; Westin et al. 1992, *Predicting Reflectance Functions from Complex Surfaces*, SIGGRAPH 92, 255–264; and Ramamoorthi et al. 2001, *An Efficient Representation for Irradiance Environment Maps*, SIGGRAPH 2001, 497–500.). Using traditional rendering methods, integration over the light bottlenecks in connection with low-frequency source illumination, which small vectors (e.g. N=25) of SH coefficients approximate well.

By related U.S. patent application Ser. No. 10/389,553, the radiance transfer of an object is precomputed in terms of low-order SHs. For a diffuse object, exit radiance results from dotting a 25-D vector, representing the source radiance, with a 25-element radiance transfer vector precomputed and stored at each sample point p. By storing this transfer vector per-vertex, real-time self-shadowing and inter-reflection results from a simple vertex shader. For a glossy object, radiance transfer is represented as a linear operator converting a 25-D source radiance vector into a 25-D transferred radiance vector, via a 625-element transfer matrix that varies for each p. This glossy transfer matrix cannot be accommodated by typical graphics hardware. Accordingly, there exists a need to provide a CPU implementation capable of achieving real-time frame rates for more than just a constant view or lighting.

SUMMARY

Clustered principal component analysis for precomputed radiance transfer is described herein.

Precomputed radiance transfer (PRT) captures how an object shadows, scatters, and reflects light. PRT includes recording a transfer matrix, respectively, over multiple surface points. In accordance with certain aspects of the invention, at run-time, the transfer matrix transforms a vector of spherical harmonic coefficients representing distant, low-frequency source lighting into exit radiance. Per-point transfer matrices form a high-dimensional surface signal that is compressed using clustered principal component analysis (CPCA). CPCA partitions multiple samples into fewer clusters, each cluster approximating the signal as an affine subspace. CPCA thus reduces a high-dimensional transfer signal to a low-dimensional set of per-point weights on a per-cluster set of representative matrices. Accordingly, the representative matrices are applied to the lighting per-cluster in, e.g., a CPU (central processing unit) environment, and the results are weighted per-point in, e.g., a GPU (graphics processing unit) environment. The output of a matrix is lower-dimensional than the matrix itself, and therefore the computation overhead is reduced.

Further, the accuracy of encoded radiance functions is increased with a least-squares optimal projection of spherical harmonics onto a hemisphere. Thus, the result is an implementation by, e.g., graphics hardware for performing real-time rendering of glossy objects with dynamic self-shadowing and inter-reflection without fixing the view or light. The result also allows significantly increased lighting frequency when rendering diffuse objects and includes subsurface scattering.

BRIEF DESCRIPTION OF THE DRAWINGS

The scope of the present invention will be apparent from the following detailed description, when taken in conjunction with the accompanying drawings, and such detailed description, while indicating embodiments of the invention, are given as illustrations only, since various changes and modifications will become apparent to those skilled in the art from the following detailed description, in which.

DETAILED DESCRIPTION

Clustered principal component analysis (CPCA) includes off-line, pre-computation and storage of per-vertex, source-to-exit radiance transfer matrices. Advantageously, but not limiting, the precomputed transfer matrices include the precomputed contribution of the object's subsurface scattering of distant environmental light.

Figure 1:
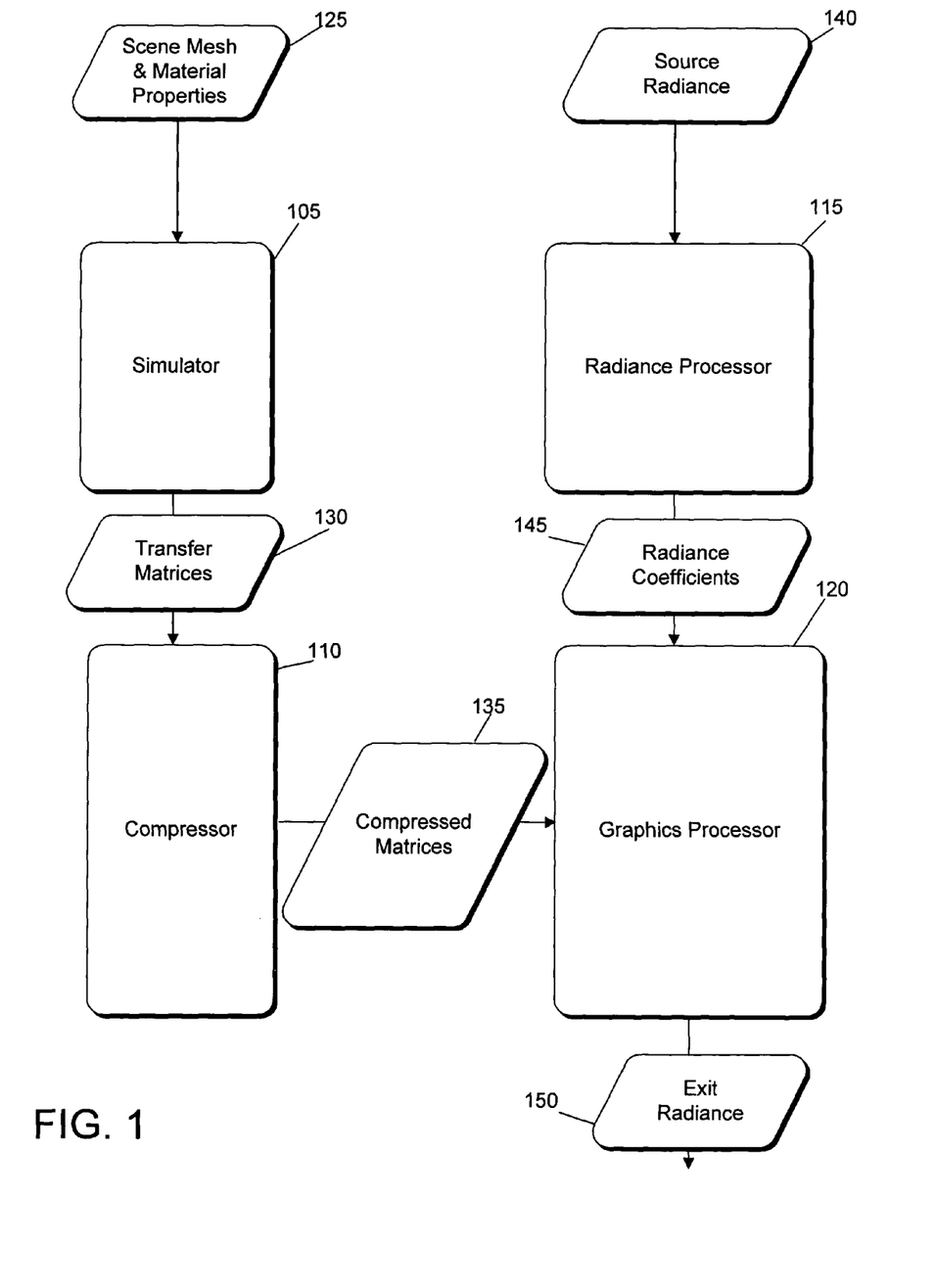
FIG. 1 is a block diagram showing an example operating environment for rendering real-time graphics as described herein.

Off-line processing in connection with the example operating environment of FIG. 1 includes an illumination simulation being run (not shown) over a virtual geometric model. Illumination simulation techniques, such as the Monte Carlo simulation, described further below, are known in the art and therefore are not described herein. These techniques mathematically capture how a virtual object shadows and scatters light, i.e., inter-reflects, light onto itself. Considerations for the simulation include the mesh of the object as well as its material properties. The result of the illumination simulation is recorded in radiance self-transfer data as a set of vectors for a diffuse object, or matrices for a glossy object, over the object.

As shown in FIG. 1, the simulation results 125 are input to PRT (precomputed radiance transfer) simulator 105, which converts the simulation results 125 into per-point transfer vectors or matrices 130 for the virtual object. The resulting transfer vectors or matrices 130 for each vertex, which are also regarded as surface signals, are input to compressor 110. Compressor 110 partitions the transfer matrices 130 into a reduced number, e.g., 128–256, of clusters. Principal component analysis (PCA) approximates the points in each cluster as a low-dimensional affine subspace (mean plus up to n'=8 PCA vectors). This approach may be regarded as clustered principal component analysis (CPCA).

For glossy transfer, CPCA reconstructs an approximation of its N×N matrix at each point by storing only the index of its cluster and a small quantity (n'<<N<<$N^2$) of scalar coordinates of projection onto the PCA vectors of the cluster. CPCA reduces not only signal storage (n' rather than $N^2$ scalars per point) but also the run-time computation. This multiplication is pre-computed in each cluster for each of its PCA vectors, and weighted versions of the n' resulting N-vectors are accumulated. CPCA on diffuse transfer similarly enhances storage and computation overhead performance.

Various representations encapsulate precomputed or acquired global illumination. PRT parameterizes transferred incident radiance in terms of low-frequency source lighting, allowing changes to lighting as well as a viewing perspective. Further to PRT and its generalization to anisotropic BRDFs, CPCA speeds up performance and reduces errors by, at least: recording exit radiance, using least-squares optimal projection of hemispherical functions, and compressing the parameters.

Thus, as further shown in FIG. 1, real-time processing includes source radiance 140 being input to processor 115, which may be a central processing unit (CPU), which approximates the source radiance 140 using spherical harmonic basis to produce a set of source radiance coefficients 145.

A PRT shader, or graphics processing unit (GPU), 120 processes the source radiance coefficients 145 through the compressed matrices 135 for each of the respective clusters. The result of such processing is the exit radiance 150, which parameterizes the radiance leaving the surface of the object at each point, thus producing the shading for each point of the virtual object in real time.

The compression of precomputed illumination datasets is motivated, in part, by the potentially vast size of such datasets. The present compression strategy hybridizes compression using vector quantization (VQ) and compression using PCA in a way that reduces error better than either method achieves by itself. Such clustering groups any number of samples that can be approximated well together regardless of their surface location, and provides a basis for real-time rendering by, e.g., graphics hardware.

PRT in related application U.S. Ser. No. 10/389,553 (Sloan, et al), incorporated herein by reference, represents transferred incident radiance. It is derived from a Monte Carlo simulation illuminating geometry by the SH basis functions (Monte Carlo ray tracing is described by, Cook et al., *Distributed Ray Tracing*, SIGGRAPH '84, 137–146; Jensen, H, *Global Illumination Using Photon Maps*, Euro-graphics Workshop on Rendering 1996, 21–30; and Kajiya, J, *The Rendering Equation*, SIGGRAPH '86, 143–150). This decouples the way an object shadows itself from its reflectance properties, and allows different BRDFs to be substituted at run-time. Computation time is reduced by approximating the transfer signal. To measure approximation error properly, the BRDF should be known. For example, a smooth BRDF weights low-frequency components of transferred radiance more than high-frequency components.

To measure signal errors properly, BRDF scaling is included by encoding the exit radiance transfer matrix at p, $M_p$. The component, $M_{p,ij}$ represents the linear influence of source lighting basis function j to exit radiance basis function i. It can be numerically integrated over light directions s and viewing directions v over the hemisphere $$H = \{(x, y, z) \mid z \geq 0 \text{ and } x^2 + y^2 + z^2 = 1\} \text{ via}$$

$$M_{p,ij} = \oint_{v \uparrow H} \oint_{s \uparrow H} y_i(v) T_p(s, y_j(s)) B(v, s) s_z ds\, dv$$

$T_p$ represents transport effects including, e.g., shadowing; B is the BRDF; y is the SH basis function; and $s_z$ is the cosine factor (z component of s). For simple shadowing, $T_p = y_j(s) q_p(s)$ where $q_p(s)$ is 0 if the object occludes itself in direction s, otherwise $q_p(s)$ is 1. For general transport where lighting is specified in a global frame, $M_p = B\, R_p\, T_p$ where $T_p$ is the glossy transfer matrix defined in related application U.S. Ser. No. 10/389,553 (Sloan, et al); $R_p$ is an SH rotation aligning p's normal to the z axis and its tangents to x and y; and B is BRDF matrix $$B_{ij} = \oint_{v \uparrow H} \oint_{s \uparrow H} y_i(v) y_j(s) B(v, s) s_z ds\, dv$$

and $R_p$ is a N×N rotation matrix.

A view-independent subsurface scattering term is added to the transport. The term is precomputed using a hierarchical diffusion approximation parameterized by the SH basis for lighting. The result affects only the constant $y_0$ basis function of exit radiance.

Exit and transferred radiance at a surface point are actually functions over a hemisphere, not a sphere. For the SH basis, the function may be evaluated on the "opposite" hemisphere when projecting it to the SH basis. Transfer in related application U.S. Ser. No. 10/389,553 (Sloan, et al) and the formulas above implicitly zero the opposite hemisphere by integrating only over the hemisphere.

The technique described herein uses a least-squares optimal projection of the SH basis onto the hemisphere. The technique represents any SH-band-limited spherical function restricted to the hemisphere without error. In contrast, zero-hemisphere projection incurs 35% worst-case and 20% average-case root-means-square (RMS) error integrated over the hemisphere for all unit-power spherical signals formed by linear combinations of the $5^{th}$ order SH basis.

A discussion of least-squares optimal projection begins by letting $f(s)$ be a function over hemisphere s=(x,y,z), $s^t$ H. When approximating $f$ as a linear combination of SH basis functions $y_i(s)$ is restricted to H where these basis functions are no longer orthogonal. Therefore:

$$f(s) \approx \Sigma_i c_i y_i(s)$$

such that this approximation has minimum squared error over H. This vector c is referred to as the least-squares optimal hemispherical projection of $f$.

To derive the coefficients $c_i$ of this projection, squared error is minimized $$E = \int_H (f(s) - \Sigma_i c_i y_i(s))^2 ds$$

This is an unconstrained minimization problem with the $c_i$ forming the degrees of freedom. $\partial E/\partial c_k$ is set to 0:

$$\partial E/\partial c_k = \int_H 2(f(s) - \Sigma_i c_i y_i(s)) y_k(s) ds = 0$$

$$\Sigma_i c_i \int_H y_i(s) y_k(s) ds = \int_H f(s) y_k(s) ds$$

This reduces to $Ac=b$ or $c=A^{-1}b$ where A is the symmetric matrix $$A_{ik} = \int_H y_i(s) y_k(s) ds$$

and b is the vector of integrals over the hemisphere of $f(s)$ multiplied by the SH basis functions $$b_k = \int_H f(s) y_k(s) ds.$$

Alternatively, b may be thought of as the standard SH projection of a spherical extension of $f$ which returns 0 when evaluated on the other half of the sphere, called the zero-hemisphere hemispherical projection. Note that A can be inverted once regardless of the function $f(s)$. Note also that A is the identity matrix when integrating over the entire sphere. When biorthogonal bases are used for wavelets, y(s) is the primal basis and $A^{-1}$ y(s) forms its dual basis.

For $5^{th}$ order SH projection (25 basis functions), the matrix A is nearly singular, with its smallest singular value set to $6.59 \times 10^{-6}$ and its largest singular value set to 1. As a comparison, the second smallest singular value is $3.10 \times 10^{-4}$. One of the SH basis functions can be discarded since at least one is very well approximated as a linear combination of the others when restricted to a single hemisphere. A simple analysis shows that discarding the $l=1, m=0$ SH basis function, i.e., the SH basis function that is linear in z, has the smallest squared error, $1.48 \times 10^{-5}$, when approximated as a linear combination of the other basis functions.

Given a vector b which projects a hemispherical function into the SH basis by zeroing out the opposite hemisphere, the optimal hemispherical projection is $A^{-1}$ b where A is defined above. Therefore, a projected exit radiance transfer matrix is given by $$M_p = A^{-1} B A^{-1} R_p T_p$$

projecting first transferred radiance, $R_p T_p$, and then exit radiance.

To perform error analysis of various projections, the difference between the zero-hemisphere and least-squares optimal projections is first compared. The integral, $\int_H (\Sigma_i c_i y_i(s))^2 ds$, of the squared value of an approximated function specified by its least-squares optimal coefficient vector c is given by $c^T A c$. If, as before, b is the zero-hemisphere hemispherical projection of $f$, then $c=A^{-1}$ b is the optimal least-squares hemispherical projection of $f$. The squared difference between these two projections integrated over H is:

$$E_1 = (c-b)^T A (c-b) = c^T [(A-I)^T A (A-I)] c = c^T Q_1 c$$

wherein I is the identity matrix. $E_1$ attains a maximum value of 0.125 and an average value of 0.0402 over all signals formed by linear combinations of up to $5^{th}$ order SH basis functions having unit squared integral over the sphere; i.e., over all unit-length 25D vectors c. Worst- and average-case errors are derived as the largest and average singular value of the symmetric matrix $Q_1$. These are large differences as a fraction of the original unit-length signal; using the RMS norm enlarges them still more via a square root. Optimal projection represents any element of this function space without error.

Another way of restricting the SH basis to the hemisphere is to reflect the value of $f$ about z to form a function defined over the whole sphere, via $$f_{odd}(x, y, z) = \begin{cases} f(x, y, z), & \text{if } z \geq 0 \\ -f(x, y, -z), & \text{otherwise} \end{cases}$$

A derivation can then be made of a hemispherical projection of $f$ as the coefficient vector given by the standard SH projection of $f_{odd}$. This method may be referred to as the odd reflection hemispherical projection. A spherical function given by its SH coefficient vector c and then restricted to the $z \geq 0$ hemisphere yields a projection coefficient of $2c_i$ for the odd SH basis functions, for which $y_i(x,y,z) = -y_i(x,y,-z)$, and 0 for the even SH basis functions, for which $y_i(x,y,z) = y_i(x,y,z)$. It is noted that all SH basis functions are either odd or even in z.

Reflection projection is analyzed in terms of squared error in the same way as for zero-hemisphere projection. Since the projection should have a comparable number, i.e., at least 25, of nonzero projection coefficients, SH basis functions up to order 8 are used, including 28 odd (and thus nonzero) basis functions and 36 even ones, for a total of 64. Using this projection method for the same $5^{th}$ order function space of interest, represented by the coefficient vector c, yields error $E_2$ defined as $$E_2 = c^T [(D^*A - I)^T A (D^*A - I)] c = c^T Q_2 c$$

wherein $D^*$ is a $64 \times 64$ diagonal matrix which scales odd basis functions by 2 and even ones by 0, and A is the symmetric matrix defined previously but now for up to $8^{th}$ order ($64 \times 64$). Using an SVD of the upper left $25 \times 25$ block of the symmetric matrix $Q_2$, the worst case error over all unit-length 25D vectors c is given by its largest singular value and equals 0.145. The average squared error is given by the average singular value of the upper-left block of $Q_2$ and equals 0.044. In other words, odd reflection is worse than zero-hemisphere projection in both worst-case and average-case, even though it has more projection coefficients.

A similar analysis can be applied to even reflection, by projecting the even reflection extension of $f$ defined as $$f_{even}(x, y, z) = \begin{cases} f(x, y, z), & \text{if } z \geq 0 \\ f(x, y, -z), & \text{otherwise} \end{cases}$$

For $7^{th}$ order SH basis functions, 28 are even and thus produce nonzero coefficients. An error measure for even reflection is identical to $E_2$ except that its diagonal matrix $D^*$ scales by 2 the even basis functions and zeroes the odd. This projection provides worst-case error over all unit-length signals c of 0.022 and average-case error of 0.0036; still significant but far less than either the zero-hemisphere or odd reflection projections. Even reflection using a smaller $5^{th}$ order basis with only 15 relevant basis functions provides 0.193 worst-case and 0.030 average-case error, which is better average-case error than zero-hemisphere projection with many fewer coefficients.

So even reflection is better than zero-hemisphere which in turn is better than odd reflection to approximate functions over the hemisphere. This can be understood because odd reflection produces a discontinuous spherical extension, while even reflection is continuous. Zeroing out the hemisphere is at least continuous for a portion of its basis functions, particularly the odd ones.

CPCA takes into consideration an n-dimensional signal $x_p$ sampled at points p over a surface. Each $x_p$ represents exit radiance as a linear operator on a light vector, and takes the form of vectors for diffuse surfaces, e.g., $n=N=25$, or matrices for glossy surfaces, e.g., $n=N^2=625$. To approximate this signal, samples are partitioned into a number of clusters, each of which is approximated by an affine subspace. The points in a cluster are approximated by $$x_p >> \tilde{x}_p = x_0 + w_p^1 x_1 + w_p^2 x_2 + \ldots + w_p^{n'} x_{n'}$$

wherein the n'+1 n-vectors $x_0, x_1, \ldots, x_{n'}$ are constant over the cluster and the n' scalar weights $w_p^1, w_p^2, \ldots, w_p^{n'}$ vary for each point p on the surface; to reduce signal dimensionality $n' << n$. The vector $x_0$ is referred to as the cluster mean, and the vectors $x_i$, $i \geq 1$ are referred to as the cluster PCA vectors. Together, the cluster's mean and PCA vectors are referred to as its representative vectors.

CPCA generalizes PCA (single cluster, $n'>0$) and VQ (many clusters, $n'=0$). VQ approximates a signal as a piecewise constant while PCA assumes it is globally linear. CPCA exploits the local linearity of a radiance transfer signal by breaking it down into clusters, with each cluster being approximated with a separate affine subspace.

Figure 2:
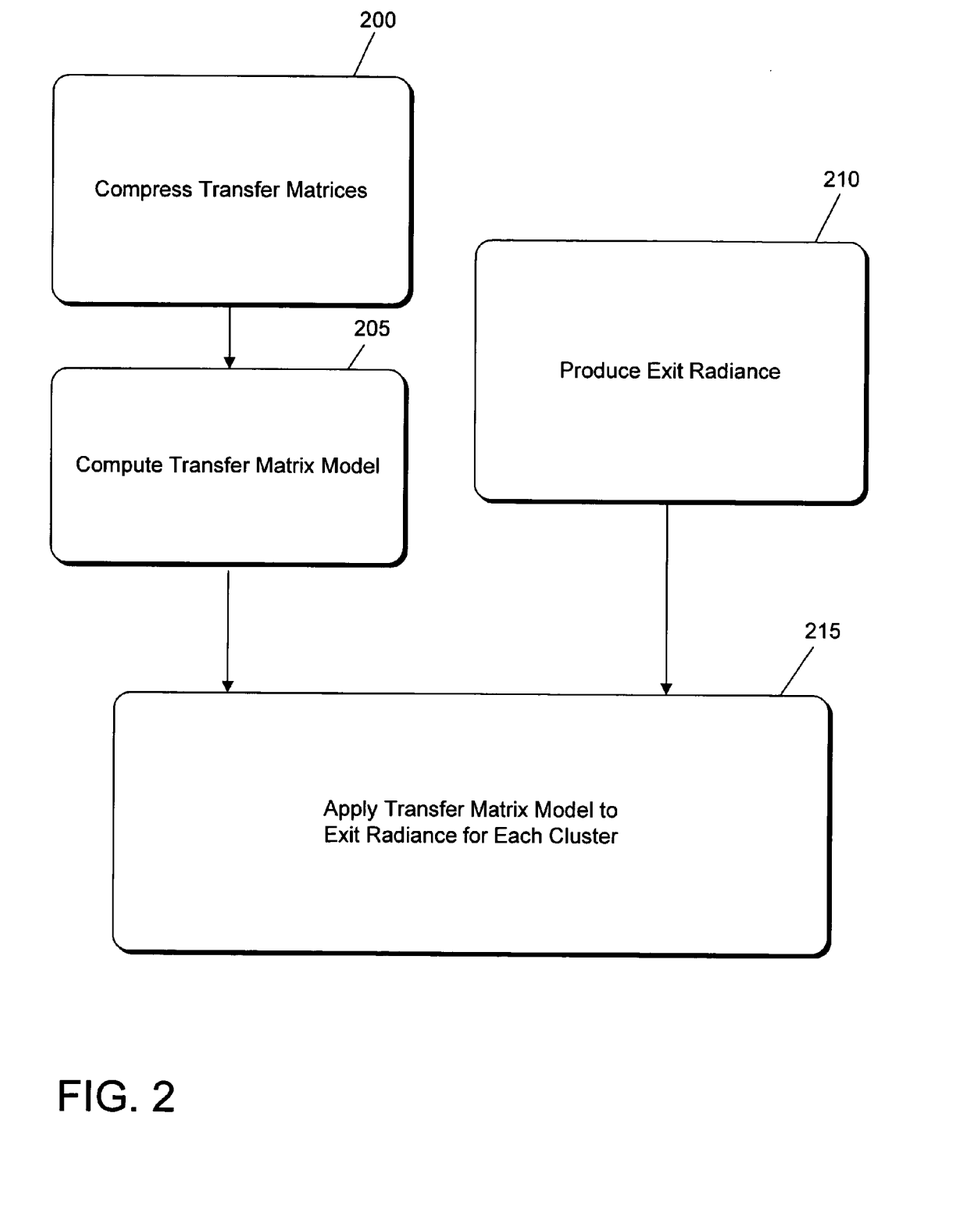
FIG. 2 illustrates the processing for a feature according to an example embodiment.

FIG. 2 provides an overview of CPCA processing. As shown, the process includes a pre-processing portion and a real-time processing portion. Pre-processing in an off-line domain includes compressing 200 per-point transfer matrices for a geometrical object based upon a parameterized relationship between a respective point and a cluster mean. Accordingly, a transfer matrix model is computed 205 for each respective cluster.

Real-time processing in an on-line domain includes parameterizing transferred incident radiance in terms of low-frequency source lighting, allowing changes to lighting as well as a viewing perspective, thus producing 210 a set of source radiance coefficients. More specifically, source radiance coefficients are produced, for example, by a CPU, by approximating source radiance using a spherical harmonic basis. Exit radiance used in rendering an object is produced by applying 215 the source radiance coefficients to the transfer matrix model for each of the respective clusters.

Figure 3:
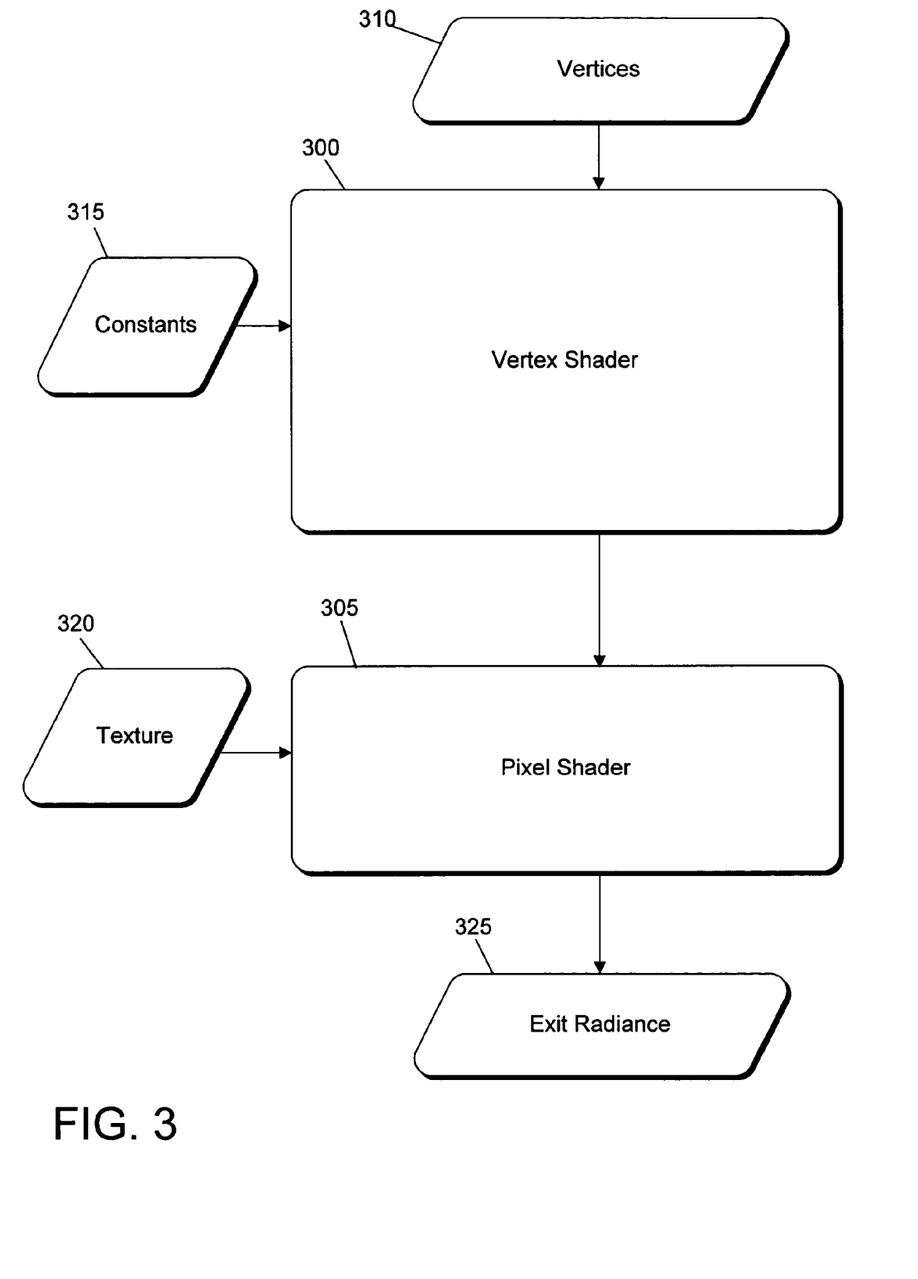
FIG. 3 illustrates an example of graphics processing further to the embodiment of FIG. 2.

FIG. 3 provides an overview of graphics processing. Data 310 for each of the vertices is input to vertex shader 300. Vertex data 310 includes a static vertex buffer, which includes the position, local frame, and cluster index for each vertex. The data for each vertex also includes a binary value, or "incluster," which is a "1" if the respective vertex is in the current cluster and "0" if the vertex is outside of the present cluster. Further, projection coefficients are also stored at each vertex. For every graphics frame, constants 315 are input to vertex shader 300. Such constants include an "eye point" in an object space as well as the corresponding transformation matrix.

With the foregoing input data 310 and 315, in addition to per-cluster exit radiance vectors, vertex shader 300 computes a view vector in a local frame and exit radiance vector.

The view vector and exit radiance vector are then passed to pixel shader 305, which evaluates exit basis functions, stored as a texture 320, in an interpolated view direction. The result is dotted with the interpolated exit radiance vector to compute a scalar value for exit radiance 325. Such processing is performed for each of RGB in each frame.

A first CPCA method clusters the points using VQ, and then computes a PCA fit in each of the resulting clusters. Using an LBG clustering algorithm (see Linde, et al., *An Algorithm for Vector Quantization Design*, IEEE Transactions on Communication COM-28, 84095), a desired number of clusters are generated by random points from the signal and then each point is classified into the cluster having minimum distance to its representative. Each cluster representative is updated to the mean of all of its points. The algorithm is iterated until no points are switched or an iteration count is reached.

For per-cluster PCA, the cluster mean, $x_0$ is computed first. Then a $m_k \times n$ matrix of residuals is computed after subtracting the mean, $C = [x_{p1}-x_0, x_{p2}-x_0, \ldots, x_{pnk}-x_0]^T$, wherein $m_k$ is the number of points in cluster k. Computing an SVD yields $C = U\,D\,V^T$ wherein U and $V^T$ are rotation matrices and D is a diagonal matrix whose elements are sorted in decreasing order. The first n' rows of V (columns of $V^T$) are the cluster PCA vectors. A point $p_j$'s projection weights (n'-vector $w_{p_j}$) are given by the first n' columns of row j of UD. They are also given simply by the dot product of $x_{p_j}-x_0$ with each of the PCA vectors. This provides a least-squares optimal linear approximation of C from combinations of n' fixed vectors. Total squared error over all cluster points is given by $$\sum_{j=1}^{m_k} \|x_{p_j} - \tilde{x}_{p_j}\|^2 = \sum_{i=n'+1}^{n} D_i^2 = \sum_{j=1}^{m_k} \|x_{p_j} - x_0\|^2 - \sum_{i=1}^{n'} D_i^2$$

The SVD of C can be directly computed using a LAPACK routine dgesvd. To reduce matrix size and reduce computations, a conversion is made to normal form. When $m_k \geq n$, the $n \times n$ matrix $C^T C$ its eigenvalues (which are the squares of C's singular values) and eigenvectors (which are equal to C's right singular vectors $V^T$ and thus the needed PCA vectors) are computed. When $m_k < n$, a computation is made for the $m_k \times m_k$ matrix $CC^T$. Its eigenvalues are the squares of C's singular values, but its eigenvectors are C's left singular vectors, U, from which the right can be derived via $V^T = U^T D^{-1} C$. A second LAPACK routine (dsyevx) computes eigenpairs of symmetric matrices like $C^T C$ and $CC^T$, and reduces computational overhead because it can return just the n' eigenpairs having the largest eigenvalues, while dgesvd returns all singular values.

The preceding discussion clusters by using a distance to the cluster mean $\|x_p - x_0\|^2$ as the classification metric. Another value of significance is the approximation error $\|x_p - \tilde{x}_p\|^2$. Iterative PCA exploits this observation by classifying points in the cluster that minimizes approximation error rather than distance to the mean. Also, after every point classification step, rather than only once at the end of the whole clustering process, it computes a PCA of the cluster's current point members to update the affine subspace model. This approximation error at a point $x_p$ is computed as:

$$\|x_p - \tilde{x}_p\|^2 = \|x_p - x_0\|^2 - \sum_{i=1}^{n'}((x_p - x_0) \cdot x_i)^2.$$

To avoid local minima having high error, additional PCA vectors are introduced one by one, from zero to n'. Multiple iterations, e.g., 10–20, of the generalized LBG algorithm are performed for that number of vectors before adding another.

Per-cluster adaptation of the number of PCA vectors provides that neither static nor iterative CPCA distribute error homogenously, with some clusters potentially having significantly more error than others. Without increasing the overall amount of per-point data, errors are reduced by allowing clusters with high error to use more PCA vectors and clusters with less error to use fewer PCA vectors. Such adaptation is used to avoid local overfitting.

The squared singular value $D_i^2$ in a cluster represents how much total squared error is reduced by the addition of PCA vector i to that cluster. However, clusters do not contain the same number of points; adding an additional PCA vector in a cluster with more points requires more computations than a cluster with fewer points because an additional weight must be stored per point. Thus, PCA vectors are ranked by $D_i^2/m_k$, which represents the rate at which per-point squared error will be reduced by the addition of PCA vector i in cluster k containing $m_k$ points. This quantity is sorted in decreasing order over all PCA vectors in all clusters, and PCA vectors are added according to this order, i.e., greatest error-reduction rate first, until it reaches its total threshold of PCA vectors.

The overall algorithm starts with the CPCA result from the previous section (constant number of PCA vectors per cluster). Additional adaptation iterations then perform the following:

classify each point to the cluster having minimum approximation error, using the cluster's current n', update cluster representatives using PCA, redistribute the number of PCA vectors over all clusters by sorting over $D_i^2/m_k$ and adding vectors (vector i from cluster k) in decreasing order until $\Sigma m_k$ reaches its threshold, and record the number of PCA vectors allocated in each cluster.

The clusters discussed above ignore where samples lie on the object's surface, thus ignoring that clusters that have ragged boundaries or contain multiple components. This leads to rendering inefficiency because triangles whose vertices are in different clusters may then be drawn multiple times. For each triangle, this overdraw is defined as the number of unique clusters its vertices belong to. Overdraw summed over all mesh triangles represents the number of triangles sent to the graphics hardware for rendering, as will be discussed further below.

Two techniques for reducing overdraw are described herein. The first technique seeks a better cluster for each vertex that reduces overdraw without significantly increasing approximation error. This search attempts to reclassify the vertex's signal in its neighboring vertices' clusters, and computes the resulting overdraw reduction and error increase. The technique then sorts all vertices by overdraw reduction divided by error increase, and re-clusters each vertex in decreasing order of this quotient until reaching an increased error threshold, such as 5–10% of the initial error. Vertex reclassification requires recomputation of the quotient for the vertex and its neighbors.

The second technique for reducing overdraw may be referred to as superclustering, and it allows graphics hardware to draw a group of clusters as a single unit. Superclustering reduces overdraw because triangles straddling clusters from the same supercluster need not be drawn more than once. Superclustering also ensures that primitive batches are large enough to maximize performance, with the number of clusters in a supercluster being limited by the number of registers available in the graphics hardware. Unlike reclassification, superclustering does not increase approximation error.

Superclusters are formed by initializing them to be the clusters, then repeatedly merging neighboring superclusters in order of overdraw reduction. Two superclusters neighbor each other when at least one triangle has vertices from both.

Rendering using CPCA-encoded transfer may include shading a glossy surface at point p using CPCA-encoded transfer, via:

$$y^T(v_p)(BR_pT_p)l = y^T(v_p)(M_p)l$$

In this case, the column-vector l results from projecting source lighting (in a global coordinate frame) into the SH basis. The matrix $T_p$ converts this source lighting to transferred incident radiance to account for self-shadowing and inter-reflection. The rotation matrix $R_p$ aligns the global coordinate system to a local frame defined by point p's normal and tangential directions. BRDF matrix B converts local incident radiance into exit radiance. Column-vector y ($y^T$ is a row-vector) of SH basis functions is evaluated at the view direction at p, $v_p$, expressed in the local frame. In general, the matrix $M_p$ transforms source radiance into exit radiance at every point on the surface. This general formulation can include effects that cannot be produce BRDF. In the above equation, y and 1 are N-vectors and B, R, and T are N×N matrices. A fifth-order SH projection, N=25, is accurate when the lighting and BRDF are low-frequency.

The source lighting vector l can be computed in various ways, as discussed in related application U.S. Ser. No. 10/389,553, filed Mar. 14, 2003. A predefined environment can be dynamically rotated to simulate rigid rotations of the object. Graphics hardware can sample radiance near the object which is then SH-projected. Simple light sources like circles can be projected analytically. Spatial variation in l captures local lighting effects but complicates the rendering process.

Currently, transfer matrices remain too large to be manipulated by GPU. The present affine approximation used by CPCA solves this problem. CPCA includes encoding the entire matrix chain $M_p$ converting source lighting to exit radiance. This produces the approximation $$\tilde{M}_p = M_0 + w_p^1 M_1 + w_p^2 M_2 + \ldots + w_p^{n'} M_{n'}$$

Multiplying $\tilde{M}_p$ by l yields exit radiance projected into the SH basis, $e_p$, via:

$$e_p = \tilde{M}_p l = (M_0 l) + w_p^1(M_1 l) + w_p^2(M_2 l) + \ldots + w_p^{n'}(M_{n'} l)$$

or $$e_p(v_p) = y^T(v_p)\left((M_{C_p}^0 l) + \sum_{i=1}^{N} w_p^i (M_{C_p}^i l)\right)$$

wherein $e_p$ is exit radiance spherical function (in exit basis), $e_p(v_p)$ is exit radiance in direction $v_p$, $y(v_p)$ is the exit basis evaluated in direction $v_p$, $M_p$ is the source-to-exit transfer matrix, and l is the light vector (in source basis).

The matrix/vector products for each cluster on a CPU are precomputed, resulting in n'+1 fixed N-vectors, and are accumulated as a sum scaled by the per-point weights, $w_p^i$, on a GPU. For small n'<N, this reduces computation and makes the vertex data small enough for vertex shaders on current graphics cards. For example, for N=25 and n'=5, computational overhead is reduced more than a factor of 4.

The exit radiance function at $v_p$ is evaluated by dotting the vector $y(v_p)$ with $e_p$. Then y is evaluated at $v_p$ using a texture map in a pixel shader.

Diffuse surfaces simplify the computation but CPCA achieves a similar reduction. In this case, $t_p \cdot l$ computes shading where $t_p$ is an N-dimensional transfer vector and l is the lighting's SH projection as before. Using CPCA, $t_p$ is encoded as an affine combination of per-cluster representatives, and the dot product of the light with these vectors is precomputed in each cluster. The final shade is a weighted combination of n'+1 scalar values $t_p \cdot l$ which are constant over a cluster, via $$\tilde{t}_p \Box = (t_0 \Box) + w_p^1(t_1 \Box) + w_p^2(t_2 \Box) + \ldots + w_p^{n\phi}(t_{n\phi} \Box)$$

Since the per-vertex computation does not depend on N, higher-order projections (e.g., N=36 up to N=100) can be used as long as the approximation error remains acceptable for small n'. Thus, real-time rendering is possible with such high-order lighting, since the transfer vector is not stored on the GPU.

Also, $M_p$ need not be square. In an $N_r \times N_l$ matrix, more columns, $N_l$, provide for greater lighting frequency and thus longer, sharper shadows. More rows, $N_r$, provide for more specular BRDFs. $N_l$ has little effect on the run-time overhead with CPCA, since the transformation of source lighting is done per-cluster to produce vectors having dimensionality that depends only on $N_r$. Increasing $N_l$ does increase the entropy of the transfer signal, making it harder to encode and likely to require more representatives per cluster.

Non-square transfer matrices are useful in another way. Exit radiance is a hemispherical function, so the optimal least-squares projection can be used to represent $M_p$. Fifth order optimal projection of the output of $M_p$ can be performed with little error using $N_r=24$ basis functions.

In accordance with an example embodiment, the case of no superclustering is hereby considered. In operation, mesh is first decomposed into "chunks" of geometry for each cluster, where a chunk contains all faces containing at least one vertex from a particular cluster. Since this also includes vertices from other clusters, a per-vertex bit, $\alpha_p$, is stored to indicate whether the vertex p is a cluster member. Pseudo code for rendering is:

Draw the mesh into the zbuffer only (rgb=0)
Set the blending mode to add
For each cluster
    Compute n'+1 per-cluster constants ($M_i$ l or $t_i \cdot l$) on CPU
    Load per-cluster constants into graphics hardware
    DrawCluster.

DrawCluster sends the cluster's geometry to the GPU and runs a vertex shader computing the linear combination of the $w_p^i$ with the per-cluster constants. If $\alpha_p=0$, the $w_p^i$'s are also set to zero so that blending vertices from other clusters does not effect the result. In other words, the blending process uses a linear partition of unity over each triangle face that straddles multiple clusters is used.

The process of generalizing to superclusters includes computing the per-cluster constants for all clusters in the supercluster and loading them into hardware registers. Every vertex in a supercluster records a cluster index, which is used by the vertex shader as an index register to reference its cluster's constants.

For diffuse transfer, the vertex shader produces the final shaded result. For glossy transfer, the vertex shader requires normal and tangent vectors to transform the global view vector into the local frame at p to obtain $v_p$. Rasterization interpolates the resulting view vector $v_p$ and exit radiance vector $e_p$ over the pixels of each triangle. The pixel shader uses the local view vector to index a map of SH basis functions, $y(v_p)$, and then dots this result with $e_p$. A parabolic hemispherical parameterization is used for the SH map, sampled at 32×32. Since $e_p$ contains more components than current rasterization hardware can interpolate, three separate passes are performed for glossy transfer, i.e., one per color channel.

Diffuse transfer and glossy transfer also differ in their per-cluster state. For each of the n'+1 representative vectors, the per-cluster constant is a scalar color, $t_p \cdot l$ for diffuse transfer regardless of the value of $N_l$. For glossy transfer, this state is a colored $N_r$-vector, $M_r l$. Current graphics hardware, e.g., ATI 9700, Nvidia GeForce 4, supports approximately 256 registers accessible by vertex shaders, where each register contains 4 channels. For nonadaptive PCA, glossy transfer requires $m_s$ (n'+1) $N_r/4$ registers where $m_s$ is the number of clusters per supercluster. This assumes three pass rendering, one per color channel, and packs four components of an $N_r$-vector into each register. Diffuse transfer requires less state: only $m_s$ (n'+1) registers per supercluster to compute all three color channels by packing an rgb color per register.

The above description shows that CPCA-encoded transfer provides real-time rendering of global transport effects for a variety of geometric models and material characteristics, including glossy/anisotropic BRDFs and translucency. Though they depend on prerecorded transfer data over specific models, these effects new to real-time graphics. CPCA enables the approximation of high-dimensional signals (e.g., transfer matrices) over low-dimensional manifolds (e.g., 3D surfaces). It reduces error better than VQ or PCA for the same storage and yields data granularity in the approximation that better suits GPU implementation. Rather than grouping arbitrarily based on blocks in an image or polygons on a mesh, CPCA adapts cluster size and shape to the nature of the signal. Since the transfer signal is a linear operator on a light vector, representing a cluster containing many samples as a low-dimensional affine subspace not only reduces storage but converts a matrix/vector multiply per point into a weighted combination of a few pre-computed vectors. Such considerations are significant for real-time performance.

An implementation of the present invention may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A graphics processing method for illuminating a geometrical object, the method comprising:
   compressing a quantity of per-vertex transfer matrices by, at least:
      partitioning the per-vertex matrices into a quantity of clusters fewer in number than the quantity of per-vertex matrices, and
      approximating each cluster as an affine subspace with a dimensionality dependent on at least the cluster;
   computing a transfer matrix model for each cluster; and
   producing an exit radiance for each cluster by applying the transfer matrix model to at least one input parameter the exit radiance producing shading for rendering and presentation on a display.

2. The method according to claim 1, wherein the at least one input parameter is a viewing parameter.

3. The method according to claim 1, wherein the at least one input parameter is a lighting parameter.

4. The method according to claim 1, wherein the transfer matrix model includes a transfer matrix.

5. The method according to claim 4, wherein the exit radiance is:

$$y(v_p) \cdot (M_p l)$$

wherein
l is a light column vector,
$M_p$ is a transfer matrix, and
$y(v_p)$ is an exit radiance basis in direction $v_p$.

6. The method according to claim 1, wherein the transfer matrix model includes a diffuse transfer vector.

7. The method according to claim 6, wherein the exit radiance is:

$$t_p \cdot l$$

wherein
l is a light column vector, and
$t_p$ is a diffuse transfer row vector.

8. The method according to claim 1, wherein the exit radiance is:

$$t_p \cdot l$$

wherein
l is a light column vector, and
$t_p$ is a transfer vector.

9. The method according to claim 1, wherein the transfer matrix model includes an exit radiance vector.

10. The method according to claim 9, wherein the exit radiance is:

$$y(v_p) \cdot e_p$$

wherein
$y(v_p)$ is an exit radiance basis in direction $v_p$, and
$e_p$ is an exit radiance column vector.

11. The method according to claim 1, wherein the per-vertex transfer matrices correspond to surface points of the geometrical object.

12. The method according to claim 1, wherein compressing the per-vertex matrices into clusters includes:
   partitioning the per-vertex matrices based on a distance from a per-vertex transfer matrix to a mean of the transfer matrices in each cluster, and
   performing a PCA analysis on the transfer matrices.

13. The method according to claim 1, wherein compressing the per-vertex matrices into clusters includes partitioning into respective clusters per-vertex matrices based upon a measured approximation error.

14. The method according to claim 13, wherein partitioning into respective clusters per-vertex matrices based upon a measured approximation error includes iteratively replacing the transfer matrix model of the respective clusters with a mean of the corresponding transfer matrices added to a linear combination of representative transfer matrices.

15. The method according to claim 1, wherein the transfer matrix model for each cluster is determined as a linear combination of representative transfer matrices.

16. The method according to claim 15, wherein linear weights vary for each representative transfer matrix of the respective clusters.

17. The method according to claim 1, wherein $e_p$ is an exit radiance spherical function (in exit basis), and wherein producing the exit radiance for each cluster includes computing $e_p(v_p)$ which is the exit radiance in direction $v_p$, as:

$$e_p(v_p) = y^T(v_p)\left((M_{C_p}^0 l) + \sum_{i=1}^{N} w_p^i (M_{C_p}^i l)\right)$$

wherein further $y(v_p)$ is an exit basis evaluated in direction $v_p$,
$C_p$ is the cluster of which p is a member,
$M^i_{C_p}$ is the i-th representative source-to-exit transfer matrix for cluster $C_p$, and
l is a light vector (in source basis).

18. The method according to claim 1, wherein producing the exit radiance includes approximating exit radiance vectors using a least-squares optimal projection of spherical harmonics onto a hemisphere.

19. The method according to claim 1, wherein the compressing and computing are processed in an off-line domain and the producing is processed in an on-line domain.

20. The method according to claim 1, wherein compressing per-vertex transfer matrices into clusters includes producing radiance transfer data for multiple surface points of the object by simulating self shadowing and inter-reflections at each of the multiple surface points.

21. The method according to claim 1, further comprising re-classifying each per-vertex transfer matrix into clusters corresponding to adjacent vertices in order to reduce overdraw.

22. The method according to claim 1, further comprising rendering an image of the geometrical object by, for every mesh face in a cluster to which a corresponding vertex belongs, blending using a linear partition of unity if the respective mesh face straddles multiple clusters.

23. A computer-readable medium storing one or more instructions to be executed by one or more processors to render an illuminated virtual object, the one or more instructions causing the one or more processors to:
compress a quantity of per-point transfer matrices of the virtual object by, at least:
partitioning the per-point transfer matrices into a quantity of clusters lesser in number than the quantity of per-point matrices, and
approximating each cluster as an affine subspace with a dimensionality dependent on at least the cluster;
determine a transfer matrix model for each cluster; and
produce an exit radiance for each cluster by applying the transfer matrix model for each cluster to at least one input parameter.

24. The computer-readable medium according to claim 23, wherein the at least one input parameter is a viewing parameter.

25. The computer-readable medium according to claim 23, wherein the at least one input parameter is a lighting parameter.

26. The computer-readable medium according to claim 23, wherein the one or more instructions causing the one or more processors to compress the per-point transfer matrices of the virtual object into clusters includes an instruction to partition transfer matrices based on the distance from a per-point transfer matrix to a mean of the transfer matrices in each cluster.

27. The computer-readable medium according to claim 23, wherein the one or more instructions causing the one or more processors to compress per-point transfer matrices of the virtual object into clusters includes an instruction to partition per-point transfer matrices based on a distance from a per-point transfer matrix to the transfer matrix model in each cluster.

28. The computer-readable medium according to claim 23, wherein the one or more instructions causing the one or more processors to compress the per-point matrices into clusters includes one or more instructions causing one or more processors to:
partition the per-point matrices based on a measured approximation error, and
iteratively replace the transfer matrix model of the respective clusters with a mean of the corresponding transfer matrices added to a linear combination of representative transfer matrices.

29. The computer-readable medium according to claim 23, wherein the transfer matrix model for each cluster is determined as a linear combination of representative transfer matrices for each of the respective clusters.

30. The computer-readable medium according to claim 29, wherein linear weights vary for each representative transfer matrix of the respective clusters.

31. The computer-readable medium according to claim 23, wherein the transfer matrix model approximates a transfer matrix signal, and wherein further
the exit radiance is:

$$y(v_p) \cdot (M_p l)$$

wherein
l is a light vector,
$M_p$ is a transfer matrix, and
$y(v_p)$ is an exit radiance basis in direction $v_p$.

32. The computer-readable medium according to claim 23, wherein the transfer matrix model approximates a diffuse transfer vector, and wherein further
the exit radiance is:

$$t_p \cdot l$$

wherein
l is a light vector, and
$t_p$ is a diffuse transfer vector.

33. The computer-readable medium according to claim 23, wherein the exit radiance is:

$$t_p \cdot l$$

wherein
l is a light column vector, and
$t_p$ is a transfer vector.

34. The computer-readable medium according to claim 23, wherein the transfer matrix model approximates an exit radiance vector, and wherein further the exit radiance is:

$$y(v_p) \cdot e_p$$

$y(v_p)$ is an exit radiance basis in direction $v_p$, and
$e_p$, is an exit radiance vector.

35. The computer-readable medium according to claim 23, wherein the one or more instructions causing the one or more processors to produce an exit radiance includes an instruction to approximate exit radiance vectors using a least-squares optimal projection of spherical harmonics onto a hemisphere.

36. The computer-readable medium according to claim 23, wherein the one or more instructions causing the one or more processors to produce the exit radiance includes one or more instructions to:
calculate source lighting data for sampling points in the lighting environment; and
linearly transform the source lighting data.

37. The computer-readable medium according to claim 23, wherein the one or more instructions causing the one or more processors to compress transfer matrices of the virtual object into clusters is executed in an off-line domain.

38. The computer-readable medium according to claim 23, wherein the one or more instructions causing the one or more processors to determine a transfer matrix model is executed in an off-line domain.

39. The computer-readable medium according to claim 23, wherein the one or more instructions causing the one or more processors to produce the exit radiance is executed in real-time.

40. The computer-readable medium according to claim 23, further comprising one or more instructions to cause one or more processors to:

classify each transfer matrix to a cluster based on a measured approximation error;

update the transfer matrices of the respective clusters by determining a mean thereof; and perform a PCA analysis on the updated transfer matrices.

41. The computer-readable medium according to claim 40, wherein a number of representative transfer matrices varies from one cluster to another.

42. The computer-readable medium according to claim 23, further comprising one or more instructions to cause one or more processors to re-classify each per-point transfer matrix to clusters corresponding to adjacent transfer matrices to reduce overdraw.

43. The computer-readable medium according to claim 23, further including one or more instructions to cause one or more processors to render an image of the geometrical object by, for every mesh face in a cluster to which a corresponding surface signal belongs, blending using a linear partition of unity if the respective mesh face straddles multiple clusters.

44. The computer-readable medium according to claim 23, wherein the one or more instructions causing the one or more processors to produce the exit radiance includes an instruction for a processor to compute:

$$e_p(v_p) = y^T(v_p)\left((M^0_{C_p}l) + \sum_{i=1}^{N} w^i_p(M^i_{C_p}l)\right)$$

wherein further $e_p$ is an exit radiance spherical function (in exit basis), $e_p(v_p)$ is an exit radiance in direction $v_p$, $y(v_p)$ is an exit basis evaluated in direction $v_p$, $C_p$ is the cluster of which p is a member, $M^i_{C_p}$ is the i-th representative source-to-exit transfer matrix for cluster $C_p$, and l is a light vector (in source basis).

45. The method according to claim 1, wherein compressing further comprises superclustering to reduce overdraw.

46. The method according to claim 45, wherein a number of clusters in a supercluster is limited to a number of clusters capable of being rendered as a unit by rendering hardware.

* * * * *